(12) United States Patent
Lavin et al.

(10) Patent No.: US 6,243,854 B1
(45) Date of Patent: Jun. 5, 2001

(54) METHOD FOR SELECTING HIERARCHICAL INTERACTIONS IN A HIERARCHICAL SHAPES PROCESSOR

(75) Inventors: Mark A. Lavin, Katonah; Robert T. Sayah, Poughkeepsie, both of NY (US); William F. Pokorny, Jericho, VT (US); Young O. Kim, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/067,832

(22) Filed: Apr. 28, 1998

(51) Int. Cl.⁷ .................................................. G06F 17/10
(52) U.S. Cl. ........................................ 716/19; 716/3
(58) Field of Search ......................... 716/5, 4, 1, 19, 716/3

(56) References Cited

U.S. PATENT DOCUMENTS

| | | | |
|---|---|---|---|
| 5,497,334 | * 3/1996 | Russell et al. | 716/5 |
| 5,586,319 | * 12/1996 | Bell | 717/1 |
| 5,590,049 | * 12/1996 | Arora | 716/5 |
| 5,604,680 | * 2/1997 | Bamji et al. | 716/8 |
| 5,625,564 | * 4/1997 | Rogoyski | 716/1 |
| 5,629,861 | * 5/1997 | Kim | 716/8 |
| 5,740,071 | * 4/1998 | Leipold | 716/11 |
| 5,754,826 | * 5/1998 | Gamal et al. | 703/14 |
| 5,812,415 | * 9/1998 | Baisuck | 716/11 |
| 6,009,250 | * 12/1999 | Ho et al. | 716/5 |

\* cited by examiner

*Primary Examiner*—Matthew Smith
*Assistant Examiner*—Vuthe Siek
(74) *Attorney, Agent, or Firm*—F. Chau & Associates, LLP

(57) ABSTRACT

The method for selecting hierarchical interaction in a hierarchical shapes processor increases the operator's access and control over the handling of the design's hierarchical structure. The shapes of each cell are considered in accordance with a specified hierarchical relationship having constraints defined by the chosen mode of shape processing. The hierarchical relationships provide additional shape processing modes depending on the operator's physical design requirements.

8 Claims, 1 Drawing Sheet

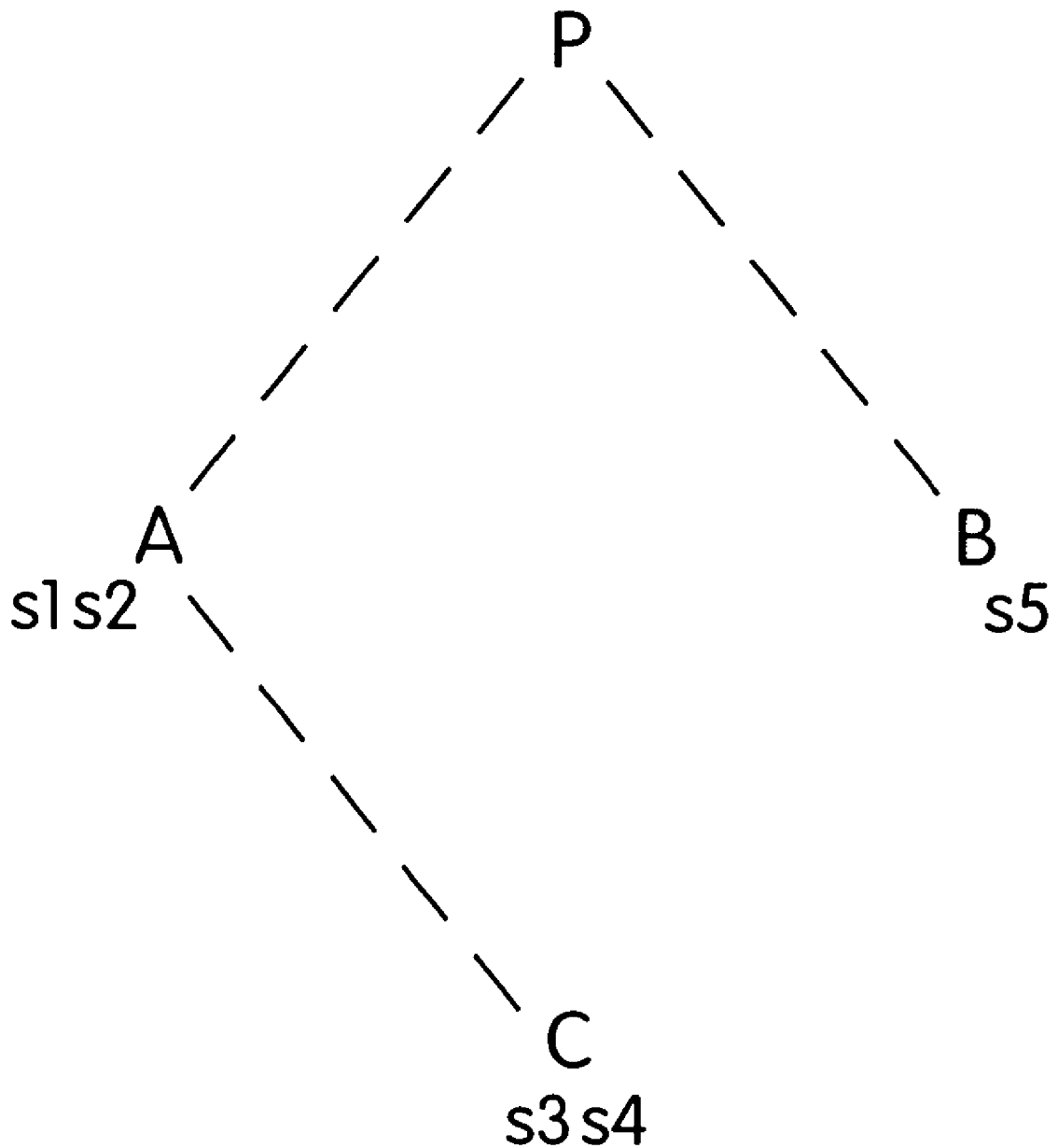

METHOD FOR SELECTING HIERARCHICAL INTERACTIONS IN A HIERARCHICAL SHAPES PROCESSOR

BACKGROUND OF THE INVENTION

1. Field of the Invention

The present invention relates to systems for processing very large scale integration (VLSI) physical designs. More particularly, it relates to a method for increasing access and control over hierarchical information in a shape processing system used in VLSI.

2. Prior Art

Current systems for processing VLSI physical designs exploit the nested, hierarchical structure of such designs to reduce the time and storage requirements for shape processing operations. Although the details of the hierarchical processing are usually not disclosed to the user, it is occasionally desirable to provide access to and control over the handling of a design's hierarchical structure. Such access and control provides the user with the ability to optimize performance of the shape-processing application.

With the shape processing systems of the prior art, the degree of hierarchical access and control are generally limited. Examples of such systems are the NIAGARA Extensible Shapes Processor and the Avanti! (formerly ISS) Hercules™. The NIAGARA system provides two modes for hierarchical processing, (1) cellwise mode, and (2) Full mode. In cellwise mode, the shapes of each cell of a hierarchical design are considered in isolation, and the possible interaction with shapes in other cells are ignored. In the Full mode, all possible shape interactions are considered.

The advantage to processing in cellwise mode is that it can potentially reduce storage and execution times by effectively partitioning the design into subdesigns (one per cell), processing the subdesigns independently, and then combining the results. The ability to select cellwise vs. full mode can be provided to the application programmer in several ways. For example, a global specification (e.g., via a command-line argument) can be used to indicate that all operations in a particular run of a shape-processing application are to be performed in either cellwise or full mode. In another example, a statement-by-statement specification can be used to indicate that particular operations are to be performed in one or the other of the two modes.

SUMMARY OF THE INVENTION

It is therefore an object of the present invention to extend the degree of access and control over hierarchical information in a hierarchical shape processing system.

It is another object of the invention to provide a method for hierarchical shape processing that performs more efficiently than existing methods.

It is yet another object of the invention to provide a method for hierarchical shape processing that can be used for design verification and design modification that enhances the manufacturability of the physical design.

These and other objects of the invention are achieved by providing the application programmer with additional or an extended set of modes for hierarchical processing. According to an embodiment of the present invention, shape information including relationships between each cell containing the shapes and every other cell in the hierarchical design are received and input into a processing system. Hierarchical relationships between the shapes are specified to constrain the identification of pairs. Each pair of shapes that satisfy the constraint (hierarchical relationship) are identified. Subsequently, all shapes that are considered pairs with a particular shape in view of the constraint are also identified. These shapes are called "neighbors". Once these neighbors are identified, a shape processing function (e.g., shape transformation, measurement, predicate, etc.) is applied to the particular shape and its neighbors, and the result is outputted.

The constraints placed on the shape processing can be varied to extend the hierarchical interaction selection depending on a desired shape processing mode. Examples of such constraints are "childcell", "parentcell", "samecell", and "peercell".

The extended hierarchical interaction selection approach and mechanisms of the present invention can be adapted to any system that processes hierarchical physical designs for purposes of design verification and/or design modification. Examples of such systems are the Avant!, Inc. Hercules™, Cadence Dracula™, Diva™, Vampire™, and Mentor Graphics Calibre™.

These systems generally all provide the "cellwise mode" described above, but do not provide the extended hierarchical interaction selection of the present invention. It is possible to use selective cell "flattening" and "exploding" capabilities of these systems in an attempt to achieve similar storage and execution efficiencies of the extended modes of the present invention. However, these capabilities have undesirable effects of themselves incurring storage and execution time overheads, and in addition, introducing undesirable changes in a design's hierarchical structure, which may compromise subsequent operations.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawing, in which like reference symbols indicate the same or similar components, wherein:

The FIGURE is a hierarchical representation example for shape processing according to an embodiment of the present invention.

DETAILED DESCRIPTION OF PREFERRED EMBODIMENTS

According to an embodiment of the present invention, the method for extending the number of access/control modes for hierarchical processing includes adding several new operating/control modes which provide an extended variety of access and control methods for optimizing the performance of a shape-processing application. The new modes are entitled "samecell", "childcell", "parentcell", and "peercell" mode.

The "samecell" mode is similar to the prior art cellwise mode, where the shapes of each cell of a hierarchical design are considered in isolation, and the possible interaction with the shapes of other cells is ignored. In the "childcell" mode, the operation performed on the "subject" shape only takes into consideration interactions with shapes that are defined in a cell that is a "child" of the one in which the subject shape is defined.

In the "parentcell" mode, the operation performed on the subject shape only takes into consideration interactions with shapes that are defined in a cell that is a "parent" of the cell in which the subject shape is defined. In the "peercell" mode, the operation performed on a subject shape only takes into consideration interactions with shapes that are defined in a cell that is neither a parent nor a child, nor is the same as the cell containing the definition of the subject shape.

These modes can be illustrated with reference to the FIGURE and table 1. According to the design hierarchy of the FIGURE, P, A, B, and C are cells, and s1–s5 are shapes contained within the respective cells. In the FIGURE, P can be considered the parent cell to cells A and B, and cell A could be considered the parent to cell C. Thus, cell C would be child cell of cell A. Cell A includes two shapes s1 and s2, cell B includes shape s5, and cell C includes shapes s3 and s4.

The following interactions are seen, depending on the mode.

TABLE 1

| Subject Shape | samecell | childcell | parentcell | peercell |
|---|---|---|---|---|
| s1 | s2 | s3 s4 | — | s5 |
| s2 | s1 | s3 s4 | — | s5 |
| s3 | s4 | — | s1 s2 | s5 |
| s4 | s3 | — | s1 s2 | s5 |
| s5 | — | — | — | s1 s2 s3 s4 |

As shown in the FIGURE and referring to table 1, s1, and s2 are within cell A, and therefore under the "samecell" mode, the subject shape s1 indicates shape s2 as being within the same cell. The reverse is true for subject shape s2 (i.e., shape s1 is displayed in the "samecell" column for the subject shape s2). When looking at subject shape s3, shape s4 is indicated in the "samecell" column because both shapes s3 and s4 are in the same cell C. The reverse is true for subject shape s4 (i.e., shape s3 is displayed in the "samecell" column for the subject shape s3). Subject shape s5 has no shape identified in the "samecell" column indicating that it does not share cell B with another shape.

As stated previously, cell A can be termed the parent of cell C, and as such, the shapes s3 and s4 within cell C are considered in the "childcell" mode of the shapes contained in cell A (i.e., shapes s1 and s2). This is shown in the "childcell" column of table 1, where shapes s3 and s4 are indicated in both rows for the subject shapes s1 and s2. No other shapes have "childcell" designations. In accordance with the "childcell" designations, the "parentcell" mode designations only exist for those shapes that are contained in a cell that is a parent to a child cell, and the parent cell also contains shapes. Cell A is the parent cell to cell C, and as such, the shapes s1 and s2 in cell A each fall within the "parentcell" column of table 1 for subject shapes S3 and S4. This indicates that shapes s1 and s2 are contained in the parent cell to the cell that contains subject shapes s3 and s4. Note that subject shapes s1, s2, and s5 have no shapes indicated in the "parentcell" mode because cell P does not contain any shapes to be considered.

The "peercell" mode performs operations on the subject shape and only takes into consideration interactions with shapes that are defined in a cell that is neither a parent nor a child, nor is the same as the cell containing the definition of the subject shape. Referring to table 1, the "peercell" mode column indicates shape s5 for subject shape s1. Subject shape s1 is in cell A, therefore in the "peercell" mode, shape s2 is not considered because it is contained in the same cell A, and shapes s3 and s4 are not considered because they are contained in child cell C with respect to cell A. With subject shape s2, the same logic results in shape s5 as the only shape considered during "peercell" mode.

Subject shapes s3 and s4 are contained within cell C, and therefore cannot have each other considered during the "peercell" mode. Thus, subject shapes s3 and s4 also only have shape s5 considered during "peercell" mode. This is also because cell A is the parent to cell C, and therefor shapes s1 and s2 are not considered. Subject shape s5 considers all other shapes s1, s2, s3, and s4 when in the "peercell" mode, because neither cell A nor cell C containing these shapes are the parent or child of cell B.

In general, the set of interactions "seen" by these four modes are mutually exclusive, and collectively exhaustive. As such, it is possible to define "mixed modes". For example, a mode entitled "differentcell" is a union of "childcell", "parentcell" and "peercell", while "full mode" is the union of all four modes. More generally, with the four modes disclosed (base modes), it is possible to define 16 modes in terms of set operations on the "base modes" described above. The combination of modes can be selectively specified by using a boolean combination of the modes.

The modes defined above can be further elaborated by taking into account hierarchical "generations". For example, in the example above, we might distinguish the relationship between cell A and cell B as being "sibling" and between cell A and cell C as being "non-sibling". In alternative forms, one could use the nomenclature of familial relations (e.g., "cousin", "great-grandparent", etc.) to specify the "quantitative hierarchical relationship(s) being selected (e.g., the hierarchical depth with respect to the least common "parent" cell of the interacting shapes.

As described with reference to the prior art modes of "cellwise/full" modes, the extended set of hierarchical selection modes provided by the present invention can be provided to the application programmer in several ways. According to a preferred embodiment of the present invention, the different modes provided can be exercised statement-by-statement or expression-by-expression. As a result, the NIAGARA Extensible Shapes processor has adopted the syntax shown in the following examples:

intersection(A, samecell(B))

meaning, the intersection of each shape on the "layer" or "level" named A with those shapes on the level B in the same cell as the A shape.

distance(P, childcell(Q))

meaning the minimum distance from each shape on level P to the shapes on level Q that are in cells that are children of the cell containing the P shape.

overlaps(X, parentcell(Y))

meaning a test (returning a true or false value) of whether each shape on level X overlaps with some shape on level Y in a cell that is one of the parents of the cell containing the X shape.

spacing(peercell(W))

meaning the minimum spacing between each shape on level W with all other shapes on level W in cells that are peers of the one containing the subject shape.

These examples show how the specification can be used for operations that pertain to the relationships between shapes on different "levels" or "layers", or among shapes on a single "level" or "layer". Thus, it is readily apparent that similar approaches could be used for other shape processing languages in order to provide the capabilities of the extended operation modes disclosed herein.

The "pair identification" process of the present invention can be termed an "intrusion search" that considers all possible pairs of shapes. By way of example, the input specification is a pair of levels containing shapes Lb ("b" for "base") and Li ("I" for intruder"), plus a geometric distance caller "ROI" (for "Region of Interest"). Thus, the intrusion search will consider all possible pairs of shapes (sb,si) where sb is a shape on level Lb and si is a shape on level Li. For each such pair, if the distance between sb and si is less than the specified ROI, then (sb,si) is one of the "identified pairs" which is referred to as an "intrusion".

At the implementation level, there are several mechanisms that enable the intrusions to be identified more efficiently that considerations of all possible pairs. Examples of these mechanisms include the use of the design's hierarchical structure, and the use of "bounding boxes" or "least enclosing rectangles" for subsets of shapes, which are well-known in the art.

The present invention further refines this identification of pairs by performing a "filter" type operation on the identified pairs. Given an "intrusion" (sb,si) that satisfies the ROI criterion, we can then use the specified hierarchical relationship to decide whether or not (sb,si) satisfies the specified hierarchical relations. For example, if the specified relationship is "peercell", then (sb,si) will be kept if and only if sb and si are shapes defined in peer cells.

By combining the hierarchical relationship filtering with the process that looks for pairs based on the ROT criterion, a more efficient shape processing procedure can be performed. By way of example, if the relationship is "peercell", then when we are considering pairs of shapes to submit to the ROI criterion, we do not bother to enumerate pairs that come from the same cell (since these would not satisfy the peercell relationship irrespective of whether they're within the ROI of each other).

The extended modes for shape processing are not dependent on the hardware implementation of the same. For example, a simple mechanism (e.g. general purpose computer programmed accordingly) capable of gathering all shape::shape interactions normally, "filtering" the gathered shape information using the extended hierarchical selection criteria of the present invention, and then applying further processing to the selected interactions would be sufficient to achieve the objective of finer-grained hierarchical control. In a preferred implementation according to the present invention, the system takes advantage of the fact that some of the interaction gathering computation can be avoided by knowing in advance the hierarchical selection criteria to be applied. For example, if it is known that only "samecell" interactions are to be considered, the interaction gathering computation can consider individual cells in isolation, and ignore the "usages" of one cell by another.

It should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A method for processing shapes in a hierarchical shapes processor comprising the steps of:

receiving input shape information;

applying a hierarchical constraint on the received shapes by selecting at least one shape processing mode and establishing constraint criteria based on the at least one processing mode is at least one selected from a group consisting of samecell, childcell, parentcell, and peercell modes;

identifying shapes satisfying the hierarchical constraint;

processing the identified shapes; and outputting the processed result, wherein said step of selecting is performed by a boolean combination of at least two of said shape processing modes.

2. A method for selectively specifying a hierarchical relationship between shapes being processed in a hierarchical shape processing system comprising the steps of:

receiving input shape information;

specifying a hierarchical relationship between received shapes, said specified hierarchical relationship is at least one mode selected from a group of modes consisting of samecell, childcell, parentcell, and peercell;

identifying pairs of shapes which satisfy the specified hierarchical relationship;

identifying all shapes that are considered pairs with a particular shape in view of the specified relationship;

applying a shape processing function to the particular shape and its neighbor; and outputting the result, wherein said step of selecting is performed by a boolean combination of at least two of said shape processing modes.

3. The method according to claim 2, wherein said step of receiving input shape information includes receiving information relating to the relationship between each cell and every other cell in a hierarchical design.

4. The method according to claim 2, wherein said step of specifying a hierarchical relationship further comprises the step of establishing constraint criteria to constrain the identification of pairs.

5. The method according to claim 4, wherein said step of identifying pairs of shapes is performed using the established constraint criteria.

6. The method according to claim 2, further comprising the step of wherein the specified hierarchical relationship is a boolean combination of at least two of said modes.

7. The method according to claim 2, wherein said step of specifying a hierarchical relationship is indicated using familial relationship nomenclature.

8. A method for processing shapes in a hierarchical shapes processor comprising the steps of:

receiving input shape information;

applying a hierarchical constraint on the received shapes;

selecting one of at least four shape processing modes, wherein interactions seen by said four shape processing modes are mutually exclusive and collectively exhaustive;

identifying shapes satisfying the hierarchical constraint;

processing the identified shapes; and outputting the processed result, wherein said at least four shape processing modes include samecell, childcell, parentcell, and peercell, and wherein said step of selecting is performed by a boolean combination of at least two of said shape processing modes.

* * * * *

UNITED STATES PATENT AND TRADEMARK OFFICE
CERTIFICATE OF CORRECTION

PATENT NO. : 6,243,854 B1
DATED : June 5, 2001
INVENTOR(S) : Lavin et al.

It is certified that error appears in the above-identified patent and that said Letters Patent is hereby corrected as shown below:

Claim 1, column 5,
Line 63, insert -- , wherein said processing mode -- following "mode".

Signed and Sealed this

Eleventh Day of December, 2001

Attest:

NICHOLAS P. GODICI
Attesting Officer
Acting Director of the United States Patent and Trademark Office